US010953690B2

(12) United States Patent
Barguet et al.

(10) Patent No.: US 10,953,690 B2
(45) Date of Patent: Mar. 23, 2021

(54) ADAPTER FOR A ROLLING ASSEMBLY AND ROLLING ASSEMBLY COMPRISING SAME

(71) Applicant: COMPAGNIE GENERALE DES ETABLISSEMENTS MICHELIN, Clermont-Ferrand (FR)

(72) Inventors: Henri Barguet, Clermont-Ferrand (FR); Arthur Topin, Clermont-Ferrand (FR); Michel Ahouanto, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 681 days.

(21) Appl. No.: 15/573,745

(22) PCT Filed: May 3, 2016

(86) PCT No.: PCT/EP2016/059831
§ 371 (c)(1),
(2) Date: Nov. 13, 2017

(87) PCT Pub. No.: WO2016/180668
PCT Pub. Date: Nov. 17, 2016

(65) Prior Publication Data
US 2018/0141374 A1 May 24, 2018

(30) Foreign Application Priority Data
May 12, 2015 (FR) ...................................... 1554219

(51) Int. Cl.
*B60C 5/16* (2006.01)
*B60C 15/02* (2006.01)
(Continued)

(52) U.S. Cl.
CPC ................ *B60B 25/08* (2013.01); *B60B 5/02* (2013.01); *B60B 21/02* (2013.01); *B60B 21/10* (2013.01);
(Continued)

(58) Field of Classification Search
CPC ........ B60C 5/16; B60C 15/02; B60C 15/0209
See application file for complete search history.

(56) References Cited

U.S. PATENT DOCUMENTS

| 4,373,567 A | 2/1983 | Declercq |
| 5,232,032 A | 8/1993 | Diernaz |

(Continued)

FOREIGN PATENT DOCUMENTS

| EP | 1 034 947 | 9/2000 |
| EP | 2 236 663 | 10/2010 |

(Continued)

*Primary Examiner* — Justin R Fischer
(74) *Attorney, Agent, or Firm* — Cozen O'Connor

(57) ABSTRACT

Adapter for rolling assembly comprising tire and rim to provide the connection therebetween. The adapter has axially inner end with inner reinforcing element, axially outer end with outer reinforcing element, and a body. The outer reinforcing element, axially outside of bearing face (21), is a bead wire made of three layers (23, 24, 25) of metal threads and concentric. First layer (23) includes metal thread of diameter D1, 0.8≤D1≤5 mm, second layer (24) has metal thread of diameter D2, D2≤1.4×D1, and wound in a helix at angle A2, 2°≤A2≤10°, and third layer (25) has metal thread of diameter D3 and wound in a helix around second layer (24) at angle A3, 2°≤A3≤10°, and of opposite sign to A2.

19 Claims, 2 Drawing Sheets

(51) Int. Cl.
    *B60B 25/08*    (2006.01)
    *B60B 5/02*     (2006.01)
    *B60B 21/10*    (2006.01)
    *B60B 21/02*    (2006.01)
    *B60B 21/12*        (2006.01)
    *B60B 25/10*        (2006.01)

(52) U.S. Cl.
    CPC ............ *B60C 5/16* (2013.01); *B60C 15/0209*
        (2013.01); *B60B 21/12* (2013.01); *B60B 25/10*
                    (2013.01); *B60B 2900/351* (2013.01)

(56)           References Cited

U.S. PATENT DOCUMENTS 6,244,318 B1 *  6/2001  Shoyama ................ B60C 15/04
                                                            152/540
    6,302,175 B1    10/2001 Shoyama
    7,290,579 B2 *  11/2007 Yamamoto .............. B60C 15/04
                                                            152/540
    2002/0088520 A1  7/2002  Bestgen
    2010/0300592 A1  12/2010 Miyazaki

FOREIGN PATENT DOCUMENTS

GB          2 085 375       4/1982
    WO          WO 92/01576     2/1992
    WO          WO 00/78565    12/2000

* cited by examiner

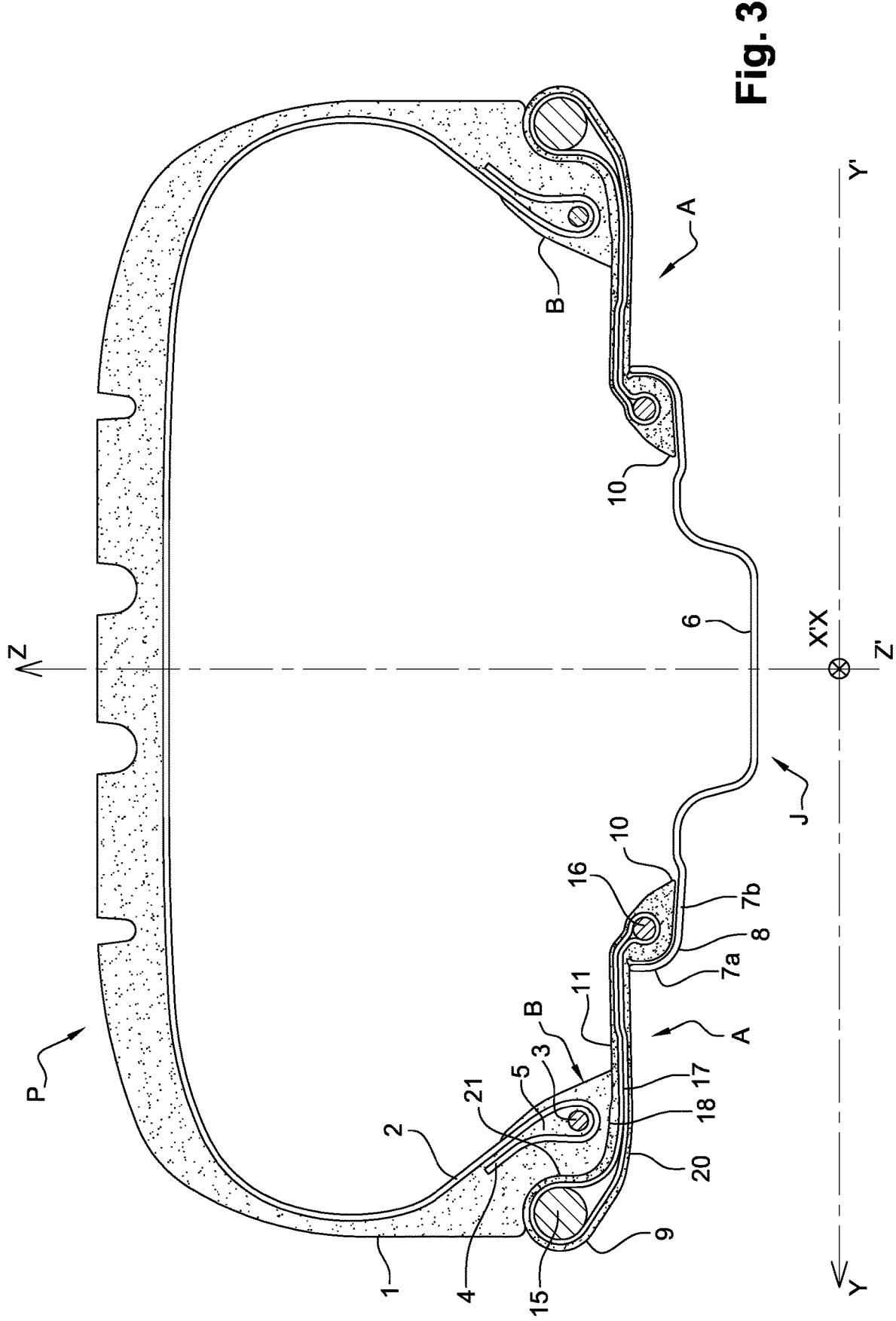

ADAPTER FOR A ROLLING ASSEMBLY AND ROLLING ASSEMBLY COMPRISING SAME

RELATED APPLICATIONS

This is a U.S. National Phase Application under 35 USC 371 of International Application PCT/EP2016/059831 filed on May 3, 2016.

This application claims the priority of French application no. 1554219 filed May 12, 2015, the entire content of which is hereby incorporated by reference.

FIELD OF THE INVENTION

The invention relates to an adapter for a rolling assembly comprising a tire and a rim, the said adapter being intended to provide the connection between the tire and the rim. The invention also relates to a rolling assembly comprising the said adapter.

BACKGROUND OF THE INVENTION

A tire is a toric structure, the axis of revolution of which is the axis of rotation of the tire, comprising a tread intended to come into contact with the ground, two sidewalls and two beads intended to come into contact with a rim, the two beads being connected to the tread by the two sidewalls.

A reminder of the definitions used in the present invention is given below:

"axial direction": direction parallel to the axis of rotation of the tire,

"radial direction": direction perpendicular to the axis of rotation of the tire, "radial plane": plane which contains the axis of rotation of the tire, and defined by the radial and axial directions, "circumferential direction": direction perpendicular to a radial plane, "equatorial plane": plane perpendicular to the axis of rotation and passing through the middle of the tread of the tire.

It is already known from application WO00/0078565 to insert a connecting element or adapter between the beads of a tire and a rim. This adapter, made of reinforced rubber compounds, is elastically deformable at least in the two, radial and axial, directions. Such an adapter makes it possible to separate that part of the rolling assembly that can be considered to actually act as a tire from that part of the rolling assembly that can be considered to act as a rim.

However, although such a rolling assembly allows the tire to perform its conventional functions, notably a drift thrust response following the application of a drift angle to the tire, thereby giving the rolling assembly sufficient flexibility to protect the tire from any damage, it does not perfectly ensure sufficient deformability of the rolling assembly in the event of impacts with kerbs or holes in the roadway, such as potholes.

Specifically, the adapter of the above-referenced prior art, which ensures connection between each bead of the tire and the rim, does not have optimum mechanical features, chiefly in terms of stiffness, that make it possible to absorb large deformations as the rolling assembly passes over potholes. This may lead to residual plastic deformation, even breakage, of the said adapter and, therefore, to damage to the rolling assembly.

In addition, this document gives no suggestion regarding adapter design evolutions that might make it possible to overcome the aforementioned disadvantages.

SUMMARY OF THE INVENTION

One object of the present invention is to provide a new adapter that is more resistant to impacts when the rolling assembly is used on roads in poor condition, while at the same time maintaining a high level of performance of the rolling assembly with regard to roadholding, in particular its ability to sustain high drift thrusts.

One aspect of the invention is directed to an adapter for a rolling assembly having an axis of rotation, the rolling assembly comprising a tire having two beads, a rim with two rim bead seats and, for each bead, the said adapter providing the connection between the bead and the rim, the said adapter comprising:
an axially inner end comprising an inner reinforcing element and intended to be mounted on a rim bead seat,
an axially outer end comprising an outer reinforcing element and intended to come into contact, via a substantially radial axially inner face, or bearing face, with a bead,
a body connecting the axially outer end to the axially inner end so as to form a single piece, and comprising at least one main reinforcement providing the connection between the outer reinforcing element and the inner reinforcing element, and comprising a substantially axial adapter seat intended to come into contact with a bead, the outer reinforcing element being positioned wholly axially on the outside of the bearing face, the outer reinforcing element being an annular structure, referred to as a bead wire, having a mean line and being made up of a stack of at least three layers made up of metal threads and concentric with respect to the mean line, a first layer or core comprising at least one metal thread having a diameter $D_1$ at least equal to 0.8 mm and at most equal to 5 mm, a second layer being made up of a metal thread having a diameter $D_2$ at most equal to 1.4 times the diameter $D_1$ and wound in a helix around the core forming, with the mean line of the bead wire, an angle $A_2$ at least equal to 2° and at most equal to 10°, and a third layer being made up of a metal thread having a diameter $D_3$ and wound in a helix around the second layer forming, with the mean line of the bead wire, an angle $A_3$ at least equal to 2° and at most equal to 10°, and of opposite sign to that of the angle $A_2$.

An adapter, the element connecting tire and rim, allows a rolling assembly, during rolling, to have sufficient radial deformations at the bead of the tire to afford the desired protection against lateral impacts.

The axially outer end of the adapter axially delimits a portion of the adapter body, referred to as adapter seat, and intended to receive a tire bead. The adapter seat performs the same function as a rim seat, which is the substantially axial portion of a rim bead seat. In the axial direction, the bearing face of the axially outer end serves to support the bead of the tire in the manner of a rim flange, which is the substantially radial portion of a rim bead seat. The tire is therefore axially immobilized by the inflation pressure and is pressed firmly against the bearing face of this axially outer end, in the manner of what happens conventionally in the case of a bead of a tire pressed against a rim flange.

The axially inner end of the adapter could be termed an "adapter bead" since it is intended to attach the adapter to the seat of a rim bead in the same way as is conventionally done by the bead of a tire pressed against a rim bead seat.

Thus, while in use, the tire is practically axially immobilized with respect to the rim. More specifically, the beads of the tire are axially immobilized with respect to the rim, like with a conventional rolling assembly in which the beads of the tire are mounted directly on the rim bead seats. By contrast, the beads of the tire are not immobilized radially with respect to the rim. More specifically, the beads of the tire have the possibility of moving radially with respect to the rim. Under standard running conditions, the axial deformation of the adapter is negligible with respect to its radial deformation. On the other hand, during an impact, the axial deformation of the adapter can be great, thereby contributing to reducing the mechanical loadings on the rolling assembly.

The adapter according to an embodiment of the invention has an axially outer end the reinforcing element of which is primarily arranged radially on the outside of the adapter seat. The outer reinforcing element of the axially outer end is an annular structure, referred to as a bead wire, having a mean line and being made up of a stack of at least three layers made up of metal threads and concentric with respect to the mean line. By definition, the mean line of the bead wire is the locus of the centres of mass of the successive sections of the bead wire, namely the locus of the centres of the circles in the case of circular cross sections. A first layer or core of the bead wire, which is radially the innermost layer, comprises at least one metal thread having a diameter $D1$ at least equal to 0.8 mm and at most equal to 5 mm. A second layer of the bead wire is made up of a metal thread having a diameter $D2$ at most equal to 1.4 times the diameter $D1$ and wound in a helix around the core forming, with the mean line of the bead wire, an angle $A2$ at least equal to 2° and at most equal to 10°. A third layer of the bead wire is made up of a metal thread having a diameter $D3$ and wound in a helix around the second layer forming, with the mean line of the bead wire, an angle $A3$ at least equal to 2° and at most equal to 10°, and of opposite sign to that of the angle $A2$.

Thus, each of the second and third layers of the bead wire is produced by the helical winding of a single thread. The helical windings of the threads that respectably make up the second and third layers of the bead wire are performed in opposite directions of rotation and constitute what is referred to as a twist. The twist has the advantage of creating natural and lasting cohesion between the threads, thanks to a constant orientation of the helical curvature of each thread of the layer with respect to the mean line of the bead wire.

Furthermore, for a given layer, the use of a single thread makes it possible to limit the discontinuity of the layer to its two circumferential ends only and makes the annular structure of the bead wire easier to produce by simply butting the circumferential ends of the layers together.

The main advantage of the adapter according to an embodiment of the invention is that it improves the mechanical strength of the rolling assembly, subjected to harsh road use, through greater deformability of the adapter, particularly greater axial deformability. This deformability is obtained through the optimization of the flexibility or suppleness of the axially outer end of the adapter, and in particular through the optimization of the flexibility of the outer reinforcing element. This flexibility is effectively permitted by a twisted bead wire which is able to deform at the same time in tension, in compression, and in bending.

Moreover, the adapter according to an embodiment of the invention has the advantage of significantly reducing the level of mechanical load transmitted to the chassis of the vehicle in the event of an impact, and thus of making it possible to make the bodyshell of the vehicle lighter. Finally, the adapter according to the invention has the advantage of having a simple design and being easy to mount on the rolling assembly.

According to one preferred embodiment, the core of the bead wire is made up of a single metal thread. This single straight metal thread acts as a support for the helical winding of the second layer.

Again as a preference, the third layer of the bead wire is made up of a metal thread having a diameter $D3$ equal to the diameter $D2$. Having the same diameter for the threads that respectively make up the second and third layer of the bead wire allows the use of the same type of thread for the second and third layers, hence simplifying manufacture. Furthermore, it allows the construction of bead wires having conventional assembly formulae.

The angles $A2$ and $A3$ formed respectively by the metal threads that make up the second and third layers of the bead wire are at least equal to 3° and at most equal to 8°. This range of angles, for the angle of each helix of the twist, makes it possible to obtain a curvature of the helix that is similar to the curvature of the mean line of the bead wire. Below the lower limit value of 3°, too small an angle gives the helix a winding pitch, about the core or about the inner second layer, that is too long, impairing the cohesion of the twist, particularly on the inside of the curvature of the bead wire, the thread of the layer concerned having a tendency to follow a rectilinear path with each turn of the twist. Above the upper limit value of 8°, too large an angle, although making it possible to improve the cohesion of the winding of the thread on the radially inner layer, gives the wire an excessive curvature, very much higher than the curvature of the mean line of the bead wire, the main consequence of this being a reduction in the bending stiffness of the bead wire.

With the second layer of the bead wire comprising, in any radial section, $N2$ sections of individual threads of diameter $D2$, the number $N2$ of sections of individual threads of diameter $D2$ is at least equal to 5. Specifically, the number $N2$ of sections of individual threads of the second layer of the bead wire is dependent on the ratio between the diameter of the winding and the diameter of the wound thread. When the diameter $D1$ of the core decreases and approaches 0.7 times the value of the diameter $D2$ of the thread of the second layer, the number $N2$ of sections of individual threads in the second layer decreases and tends towards 5.

With the second layer of the bead wire comprising, in any radial section, $N2$ sections of individual threads of diameter $D2$, and with the third layer of the bead wire comprising, in any radial section, $N3$ sections of individual threads of diameter $D3$, the number $N3$ of sections of individual threads of diameter $D3$ is at least equal to the number $N2+6$ of sections of individual threads of diameter $D2$. The number of sections of individual thread increases to a minimum of 6 at the transition from one layer to the layer immediately radially outside of it, when the diameters of the threads of each layer are equal. This increase makes it possible to achieve a sufficiently high number of sections of individual thread in 3 layers, for example at minimum 19 sections of individual thread with a single-thread core referred to as a monofilament core, that the bead wire achieves the necessary strength.

The diameter $D1$ of the metal thread that makes up the core of the bead wire is advantageously at least equal to 1.2 mm and at most equal to 4.5 mm. Below a minimum value of 1.2 mm, the cross section of the thread is too small to guarantee sufficient stiffness of the thread, and therefore of the bead wire, meaning that the adapter will not be stiff enough, and this may lead to difficulties with the steering of the rolling assembly. Above a maximum value of 4.5 mm, the cross section of the thread is too great to guarantee sufficient flexibility of the thread, and therefore of the bead wire, meaning that the adapter will not be supple enough to absorb potential impacts to the axially outer end of the adapter. It should be noted that, for a metal thread based on carbon steel which has been strengthened by work hardening, the breaking strength of the thread increases as the diameter of the thread decreases.

With the metal threads of which the first, second and third layers of the bead wire are made being made of steel and having a breaking strength Rm, the breaking strength Rm of a steel thread is at least equal to 1000 MPa and at most equal to 3000 MPa, preferably at least equal to 1400 MPa and at most equal to 2800 MPa. The breaking strength of a work-hardened steel thread generally reaches a level very much higher than that obtained with any other material liable to be used for the threads that make up a bead wire. A steel that makes it possible to achieve such a level of breaking strength of the threads furthermore guarantees the elastic flexibility of the bead wire, namely reversible flexibility of the bead wire. The reversibility of the flexible deformation of the bead wire subjected to an impact remains over the course of time, despite increasing deformation of the bead wire. The breaking strength of the steel can be increased notably by suitable choices relating to its chemical composition and its degree of work hardening.

With the bead wire having a circular radial cross section of diameter $D_S$, the diameter $D_S$ of the circular radial cross section of the bead wire is at least equal to 4 mm and at most equal to 25 mm, preferably at least equal to 6 mm and at most equal to 21 mm. The increase in the diameter $D_S$ of the bead wire, and therefore in the radial cross section of the bead wire, makes it possible to introduce a greater number of threads and, therefore, to achieve the level of stiffness needed to guarantee the security and correct operation of the rolling assembly. The possibility of assembling an increasing number of threads the diameter of which can be adjusted by layer is a degree of freedom that is attractive from a design standpoint, particularly when the diameter $D_S$ of the bead wire is limited by dimensional constraints on the expander.

According to a first embodiment of the invention, the body comprises an annular seat reinforcer radially on the inside of the adapter seat. However, this annular seat reinforcer is not compulsory.

The annular seat reinforcer advantageously has a compression modulus greater than or equal to 1 GPa, and preferably greater than 4 GPa, and more preferably still, greater than 10 GPa.

The annular seat reinforcer also advantageously comprises at least one reinforcing element coated in a polymer material.

According to a first alternative form of the first embodiment, the reinforcing element of the annular seat reinforcer comprises a metallic material such as steel. Usually, the reinforcing element is therefore made up of a layer or a stack of layers of metal cords which are collections of metal threads, the said metal cords being coated in a polymer, and usually elastomeric, material.

According to a second alternative form of the first embodiment, the reinforcing element of the annular seat reinforcer comprises a textile material such as an aliphatic polyamide or nylon, an aromatic polyamide or aramid, a polyester such as a polyethylene terephthalate (PET), or polyethylene naphthenate (PEN), or any combination of the aforementioned materials. Usually, the reinforcing element is made up of a layer or a stack of layers of textile reinforcers which are collections of spun textile filaments, the said textile reinforcers being coated in a polymer, and usually elastomeric, material.

According to a third alternative form of the first embodiment, the reinforcing element of the annular seat reinforcer comprises glass fibres coated in a polymer material.

According to other alternative forms of the first embodiment, the reinforcing element of the annular seat reinforcer may also comprise, by way of nonlimiting examples:
carbon fibres,
textile fibres other than those already mentioned: cellulose fibres such as rayon, natural fibres based on cotton, flax, hemp,
and any combination of these fibres.

The polymer materials that can be used for coating the reinforcing element of the seat reinforcer are, for example and nonlimitingly:
saturated or unsaturated elastomers, potentially containing thermoplastic blocks (thermoplastic elastomers or TPEs),
thermoplastic materials,
thermosetting materials.

According to a preferred alternative form of the first embodiment, the annular seat reinforcer is a composite material based on glass fibre coated in a thermoplastic matrix. In this case, the glass fibres constitute the reinforcing element of the annular seat reinforcer and the coating material is the thermoplastic.

The annular seat reinforcer advantageously has an axial width at least equal to 30% and at most equal to 150% of the axial width of the bead of the tire, and preferably at least equal to 40% and at most equal to 110% of the axial width of the bead of the tire.

The annular seat reinforcer may more advantageously still have a mean radial thickness at least equal to 0.3 mm and at most equal to 20 mm, preferably comprised between 0.5 mm and 10 mm. This radial thickness is dependent on the size of the tire. For a passenger vehicle tire, the radial thickness is preferably between 0.5 and 10 mm.

When the reinforcing element of the annular seat reinforcer is formed of a stack of layers of reinforcers, the annular seat reinforcer preferably has an axial width at least equal to 5 mm and at most equal to 25 mm and a radial thickness at least equal to 0.1 mm and at most equal to 4 mm.

Each layer of reinforcers of the stack of layers of reinforcers has an axial width at least equal to 1 mm and at most equal to 25 mm, and a radial thickness at least equal to 0.1 mm and at most equal to 2 mm. The axial widths and radial thicknesses of the various layers of reinforcers are not necessarily identical.

For preference, the annular seat reinforcer may be arranged, on the inside of the adapter body, radially on the outside or radially on the inside of the main reinforcement of the adapter body, or between the layers of the said main reinforcement, this main reinforcement usually comprising two layers.

According to a second embodiment of the invention, the main reinforcement of the body comprises a radial superposition of at least two layers of reinforcers, the said reinforcers being mutually parallel within one and the same layer and crossed with one another from one layer to the next and each of the layers of the main reinforcement of the body comprises reinforcers which make, with a circumferential direction of the tire, an angle at least equal to 30°, and coated with a polymer material having an elastic modulus at 10% elongation at most equal to 70 MPa. The second embodiment of the invention differs essentially from the first embodiment through the absence of an annular seat reinforcer.

In this second embodiment, the fact that the bead wire is positioned wholly axially on the outside of the bearing face and therefore on the outside of the adapter body ensures that the bead wire does not axially stiffen the body and therefore does not limit the axial deformability thereof.

In addition, the main reinforcement of the body comprises a radial superposition of at least two layers of reinforcers, the said reinforcers being mutually parallel within one and the same layer and crossed with one another from one layer to the next and each layer is made up of reinforcers which make, with the circumferential direction, an angle at least equal to 30°, these reinforcers being coated with a polymer material having an elastic modulus at 10% elongation at most equal to 70 MPa.

The main reinforcement is, in effect, made up of the winding of a layer of reinforcers respectively around the outer reinforcing element and the inner reinforcing element. This results in a radial superposition of at least two layers in the body: two layers if there is no superposition of the ends of the winding, 3 layers if there is some superposition of the ends of the winding. The angle formed by the reinforcers of a layer, with the circumferential direction, is given in terms of absolute value in the knowledge that, given the principle of manufacture adopted for the main reinforcement, the sign of the angle reverses when passing from one layer to the next.

Having a minimum threshold value for the angle of the reinforcers ensures the adapter a minimal axial stiffness needed for the cornering stiffness expected of the rolling assembly. Having an elastic modulus at 10% elongation for the polymer coating material that is below a maximum threshold value guarantees the axial deformability of the adapter.

The combination of the features of the second embodiment offers the advantage of having an adapter that is axially supple enough that it can be fitted with ease, together with a good ability to absorb large deformations in the event of pinch shock.

The main reinforcement of the said adapter body generally has a modulus at least equal to 4 GPa. It may comprise reinforcers made of all kinds of metallic or textile material such as those already mentioned in respect of the annular seat reinforcer.

The axial width of the adapter body according to an embodiment of the invention is generally at least equal to 2.54 cm and at most equal to 8 cm, and preferably at least equal to 3.17 cm and at most equal to 5.10 cm.

For preference, the adapter may be positioned on just one side of the rim, and more preferably still, on the outboard side of the vehicle. In this case, the rim then has an asymmetrical geometric shape so as to adapt to the presence of the adapter present on just one side.

When the rolling assembly comprises two adapters, these may be symmetrical or non-symmetrical. The concept of symmetry or asymmetry of the adapter is defined by the axial width of the body of the adapter. Two adapters are asymmetrical when the body of one of them has an axial width that is greater than that of the other.

For preference, the rolling assembly according to an embodiment of the invention comprises a first and a second adapter that each have a body of different or identical widths.

Another aspect of the invention is related to a rolling assembly comprising, for each bead of the tire, an adapter according to any one of the embodiments described hereinabove.

BRIEF DESCRIPTION OF THE DRAWINGS

The invention is described with reference to the following FIGS. 1 to 3, which are schematic and not necessarily drawn to scale:

FIG. 3: a radial section of a rolling assembly, comprising two adapters according to another embodiment of the invention without an annular seat reinforcer.

DETAILED DESCRIPTION OF THE DRAWINGS

Figure 1:
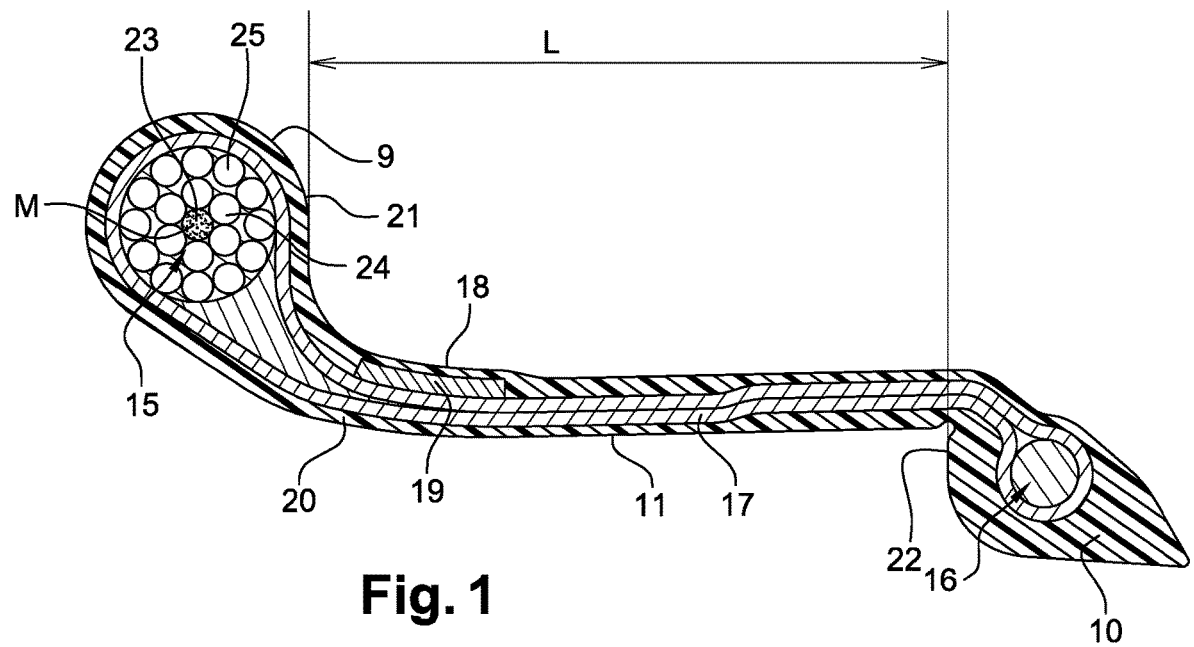
FIG. 1: a radial section of a non-mounted adapter, according to a first embodiment of the invention with an annular seat reinforcer.

FIG. 1 depicts an adapter, not mounted on a rim, according to a first alternative form of the invention with an annular seat reinforcer. This adapter comprises an axially outer end 9 comprising an outer reinforcing element 15, an axially inner end 10 comprising an inner reinforcing element 16, and a body 11 comprising a main reinforcement 17. The main reinforcement 17 is made up of a single reinforcing layer which is wound respectively around the inner reinforcing element 16 of the axially inner end 10 and around the outer reinforcing element 15 of the axially outer end 9. In the body 11, the main and return portions of the said reinforcing layer thus constitute a substantially radial stack of at least two reinforcing layers. The main reinforcement 17 is enveloped in a layer of elastomeric material 20. The body 11 further comprises an adapter seat 18 which is intended to come into contact with a tire bead. The body 11 has axial width L, measured between the axially inner face 21 of the axially outer end 9 and the axially outer face 26 of the axially inner end 10. In this first embodiment of the invention, the body 11 also comprises an annular seat reinforcer 19 radially on the outside of the main reinforcement 17 and axially on the inside of the axially outer end 9.

In FIG. 1, the outer reinforcing element 15 is an annular structure, referred to as a bead wire, having a mean line M and made up of a stack of three layers (23, 24, 25) made up of metal wires and concentric with respect to the mean line M. The first layer or core 23, which is radially the innermost layer, comprises at least one metal thread having a diameter $D1$ at least equal to 0.8 mm and at most equal to 5 mm. The second layer 24 is made up of a metal thread having a diameter $D2$ equal, in the instance depicted, to the diameter $D1$ and wound in a helix around the core 23, forming, with the mean line M of the bead wire 15, an angle $A2$ (not depicted) at least equal to 2° and at most equal to 10°. The third layer 25 is made up of a metal thread having a diameter $D3$ equal, in the instance depicted, to the diameter $D2$ and wound in a helix around the second layer 24, forming, with the mean line M of the bead wire 15, an angle $A3$ (not depicted) at least equal to 2° and at most equal to 10°, and of opposite sign to that of the angle $A2$. In the instance depicted, the core is made up of a single metal thread, the second layer 24 has a number N2 of sections of individual thread equal to 6, and the third layer 25 has a number N3 of sections of individual thread equal to 12.

Figure 2:
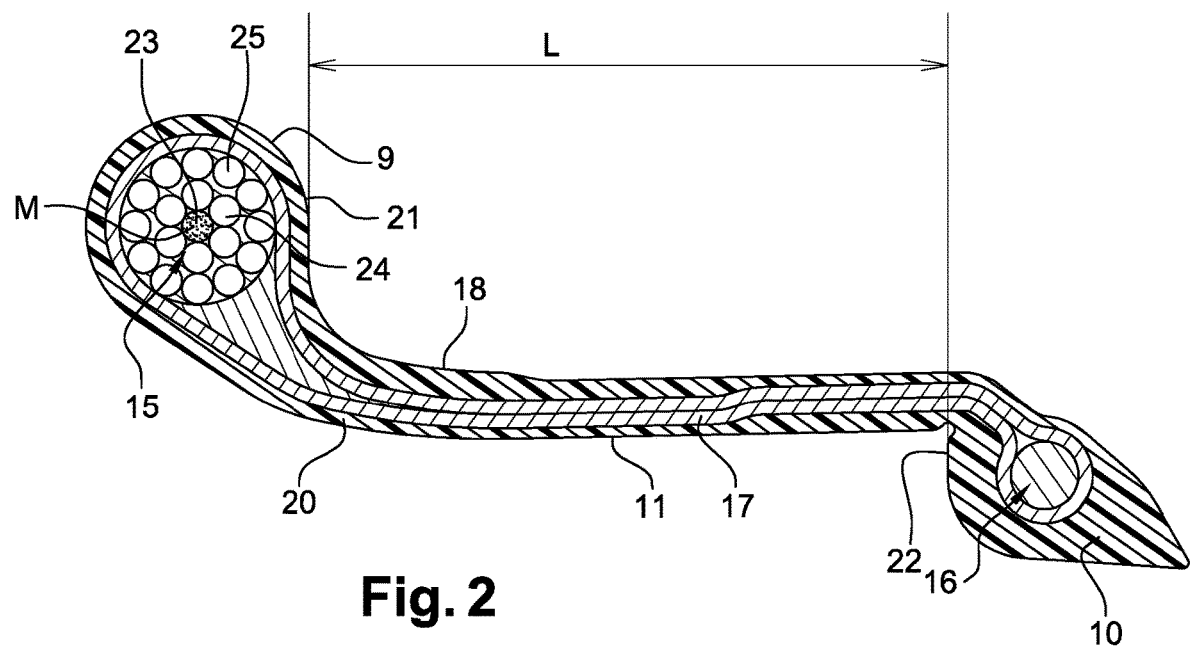
FIG. 2: a radial section of a non-mounted adapter, according to a second embodiment of the invention without an annular seat reinforcer.

FIG. 2 differs from FIG. 1 only in the omission of the annular seat reinforcer (19).

FIG. 3 shows a radial section, in a plane YZ, of a rolling assembly comprising a tire P, a rim J, and, for each bead B, an adapter A providing the connection between the bead B and the rim J. The tire P comprises a tread (unreferenced) extended radially towards the inside by two sidewalls 1, themselves extended radially towards the inside by two beads B. Within each bead B, the carcass reinforcement 2 is turned up around a circumferential reinforcing element or bead wire 3 to form a turnup 4 separated from the carcass reinforcement 2 by a filling element 5. The rim J comprises, in a middle portion, a mounting well 6, intended to make it easier to mount the beads B of the tire P and, at its axial ends, two rim bead seats 8, each one comprising a substantially radial portion or rim flange 7a and substantially axial portion or rim seat 7b. The adapter A comprises a radially inner end 10 comprising an inner reinforcing element 16 and intended to be mounted on a rim bead seat 8, an axially outer end 9 comprising an outer reinforcing element 15 and intended to come into contact via a substantially radial axially inner face or bearing face 21 with a bead B, and finally a body 11, connecting the axially outer end 9 to the axially inner end 10 so as to form a single piece, and comprising at least one main reinforcement 17 providing the connection between the outer reinforcing element 15 and the inner reinforcing element 16, and comprising a substantially axial adapter seat 18 intended to come into contact with a bead B.

By way of illustration, two examples of bead wires were evaluated as adapter outer reinforcing element 15.

The first example is a bead wire made up of 3 layers of steel reinforcers. The radially innermost first layer or core 23 comprises a metal thread having a diameter D1 equal to 3 mm. The second layer 24 is made up of a metal thread having a diameter D2 equal to 1.75 mm and wound in a helix around the core 23, forming, with the mean line M of the bead wire 15, an angle A2 (not depicted) equal to 6.2°. The third layer 25 is made up of a metal thread having a diameter D3 equal to the diameter D2, namely to 1.75 mm, and wound in a helix around the second layer 24, forming, with the mean line M of the bead wire 15, an angle A3 (not depicted) equal to 8.8°, and of opposite sign to that of the angle A2. In this instance, the second layer 24 has a number N2 of sections of individual thread equal to 8, and the third layer 25 has a number N3 of sections of individual thread equal to 14. The formula for this bead wire is therefore 1*3 mm+8*1.75 mm+14*1.75 mm.

The second example, corresponding to the scenario illustrated in FIGS. 2 and 3, is a bead wire made up of 3 layers of steel reinforcers. The radially innermost first layer or core 23 comprises a metal thread having a diameter D1 equal to 2 mm. The second layer 24 is made up of a metal thread having a diameter D2 equal to the diameter D1, namely to 2 mm and wound in a helix around the core 23, forming, with the mean line M of the bead wire 15, an angle A2 (not depicted) equal to 3.3°. The third layer 25 is made up of a metal thread having a diameter D3 equal to the diameter D2, namely to 2 mm, and wound in a helix around the second layer 24, forming, with the mean line M of the bead wire 15, an angle A3 (not depicted) equal to 6.6°, and of opposite sign to that of the angle A2. In this instance, the second layer 24 has a number N2 of sections of individual thread equal to 6, and the third layer 25 has a number N3 of sections of individual thread equal to 12. The formula for this bead wire is therefore (1+6+12)*2 mm.

The first example of bead wire of formula (1*3 mm+8*1.75 mm+14*1.75 mm) was incorporated into an adapter for a tire of size 225/45R17 mounted on a 4.5B16 wheel. Furthermore, this bead wire has a toric shape with an inside diameter equal to 471 mm and a mass equal to 713 g. This rolling assembly S1, comprising two adapters (one adapter per bead), was compared on the one hand against a standard reference rolling assembly R1 with no adapter, comprising a tire of size 225/45R17 mounted on a 7.5J17 wheel, and, on the other hand, against a rolling assembly E1 comprising a tire of size 225/45R17 mounted on a 7.5J17 wheel, and two adapters (one adapter per bead). Each adapter of the rolling assembly E1 has, as outer reinforcing element, a solid bead wire the radial cross section of which is a disc of diameter 10 mm and the constituent material of which is a glass-resin composite, namely one containing glass fibres in a resin matrix.

For each of the three rolling assemblies S1, R1 and E1 described hereinabove, the cornering stiffness DZ and the radial stiffness KZ were measured. The cornering stiffness DZ, expressed in daN/°, is the axial force that has to be applied to the tire in order to generate a 1° rotation of the rolling assembly about a radial axis. In this instance, the cornering stiffness DZ is measured for a tire inflated to a pressure equal to 2.5 bar and compressed under a radial load Z equal to 4286 N. The radial stiffness KZ, expressed in daN/mm, is the radial force that has to be applied to the tire in order to obtain a radial movement of 1 mm. In this instance, the radial stiffness KZ is measured for a tire inflated to a pressure P equal to 2.5 bar, its nominal load Z, within the meaning of the ETRTO (European Tire and Rim Technical Organization) standard, being equal to 3620 daN. In the table below, the cornering stiffness DZ and radial stiffness KZ of the tires of the rolling assemblies S1, R1 and E1 compared are expressed in the form of a relative value with respect to reference rolling assembly R1, considered as the base 100.

Furthermore, the three rolling assemblies S1, R1 and E1 were subjected to a "pinch shock" test, followed by an endurance test. A "pinch shock" test consists in subjecting the tire, inflated to a pressure P equal to 2.3 bar, compressed under a load Z equal to 500 daN and running at 45 km/h, to repeated impacts against a kerb 110 mm high, in a direction that makes an angle equal to 70° with respect to the direction of travel. At the end of this "pinch shock" test, an endurance test is performed in which the tire, running at 30 km/h, is subjected to cornering angles varying between −6° and +6° about the radial direction. The integrity of the tire is then examined at the end of this sequence of two tests.

Table 1 hereinbelow presents the results of cornering stiffness DZ, radial stiffness KZ and cornering endurance test following a "pinch shock" test for the rolling assemblies R1, E1 and S1 for a tire of size 225/45R17:

TABLE 1

Cornering stiffness, radial stiffness and endurance on 225/45R17

| Rolling assembly | Cornering stiffness DZ (Z = 4826 N, P = 2.5 bar) | Radial stiffness KZ (Z = 3620 N, P = 2.5 bar) | Integrity in cornering endurance after "pinch shock" test |
|---|---|---|---|
| R1: Tire 225/45R17 + wheel 7.5J17 | 100% | 100% | NA (puncture) |
| E1: Tire 225/45R17 + 2 adapters with external bead wire made of CVR (diam. ext 10 mm) + wheel 4.5B16 | 96% | 98% | NOK (bead wire breakage) |
| S1: Tire 225/45R17 + 2 adapters with external bead wire of formula (1 * 3 mm + 8 * 1.75 mm + 14 * 1.75 mm − diam. ext 10 mm) + wheel 4.5B16 | 97% | 98% | OK |

Table 1 shows that the two rolling assemblies E1 and S1 with adapters have cornering stiffnesses DZ and radial stiffnesses KZ of substantially the same magnitude as those of the reference rolling assembly R1 without adapter. By contrast, rolling assembly S1 performs better than rolling assembly D1 in the endurance test after the "pinch shock" test because the adapter bead wire remains intact for S1 whereas the adapter bead wire for E1 has broken.

Table 2 below shows the same type of results for three rolling assemblies R2, S21 and S22 in the case of a tire of size 245/40R18. The standard reference rolling assembly R2, without adapter, comprises a tire of size 245/40R18 mounted on a 8J17 wheel. The rolling assembly S21 comprises a tire of size 245/40R18 mounted on a 4.5J16 wheel, and two adapters (one adapter per bead). Each adapter of the rolling assembly S21 has, as outer reinforcing element, a bead wire of formula (1*3 mm+8*1.75 mm+14*1.75 mm) the circular radial cross section of which has a diameter equal to 10 mm. The rolling assembly S22 comprises a tire of size 245/40R18 mounted on a 4.5J16 wheel, and two adapters (one adapter per bead). Each adapter of the rolling assembly S22 has, as outer reinforcing element, a bead wire of formula (1+6+12)*2 mm the circular radial cross section of which has a diameter of 10 mm. Furthermore, this bead wire has a toric shape with an inside diameter equal to 471 mm and a mass equal to 707 g.

Table 2 below presents the results of cornering stiffness DZ, radial stiffness KZ and cornering endurance test following a "pinch shock" test for the rolling assemblies R2, S21 and S22 for a tire of size 245/40R18:

TABLE 2

Cornering stiffness, radial stiffness and endurance on 245/40R18

| Rolling assembly | Cornering stiffness DZ (Z = 5101 N, P = 2.5 bar) | Radial stiffness KZ (Z = 3826 N, P = 2.5 bar) | Integrity in cornering endurance after "pinch shock" test |
|---|---|---|---|
| R2: Tire 245/40R18 + wheel 8J17 | 100% | 100% | NA (puncture) |
| S21: Tire 245/40R18 + 2 adapters with external bead wire of formula (1 * 3 mm + 8 * 1.75 mm + 14 * 1.75 mm − diam. ext 10 mm) + wheel 4.5J16 | 99% | 99% | OK |
| S22: Tire 245/40R18 + 2 adapters with external bead wire of formula (1 + 6 + 12) * 2 mm avec diam. ext 10 mm) + wheel 4.5J16 | 98% | 99% | OK |

Table 2 shows that the two rolling assemblies S21 and S22 with adapters have cornering stiffnesses DZ and radial stiffnesses KZ of substantially the same magnitude as those of the reference rolling assembly R2 without adapter. In addition, the two rolling assemblies S21 and S22 both pass the endurance test following a "pinch shock" test.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A rolling assembly having an axis of rotation, the rolling assembly comprising a tire having two beads, a rim having two rim bead seats, and two adapters, for each bead, the adapter being configured to provide the connection between the bead and the rim, the adapter comprising:
   an axially inner end comprising an inner reinforcing element and adapted to be mounted on a rim bead seat;
   an axially outer end comprising an outer reinforcing element and adapted to come into contact, via a substantially radial axially inner face, or bearing face, with a bead;
   a body connecting the axially outer end to the axially inner end so as to form a single piece, and comprising at least one main reinforcement providing the connection between the outer reinforcing element and the inner reinforcing element, and comprising a substantially axial adapter seat adapted to come into contact with a bead, wherein the outer reinforcing element is wholly axially on the outside of the bearing face, wherein the outer reinforcing element is an annular structure, referred to as a bead wire, having a mean line and comprised of a stack of at least three layers comprised of metal threads and concentric with respect to the mean line, wherein a first layer or core comprises at least one metal thread having a diameter D1 at least equal to 0.8 mm and at most equal to 5 mm, wherein a second layer is comprised of a metal thread having a diameter D2 at most equal to 1.4 times the diameter D1 and wound in a helix around the core, forming, with the mean line of the bead wire, an angle A2 at least equal to 2° and at most equal to 10°, and wherein a third layer is comprised of a metal thread having a diameter D3 wound in a helix around the second layer, forming, with the mean line of the bead wire, an angle A3 at least equal to 2° and at most equal to 10°, and of opposite sign to that of the angle A2, wherein the main reinforcement comprises at least one layer of mutually parallel reinforcers, each at least one layer being wound respectively around the inner reinforcing element of the axially inner end and around the outer reinforcing element of the axially outer end, and in the body, main and return portions of the at least one layer contact one another at a midpoint of the body, so as to constitute, at least at the midpoint, a radial stack of at least two reinforcing layers.

2. The rolling assembly according to claim 1, wherein the core of the bead wire is comprised of a single metal thread.

3. The rolling assembly according to claim 1, wherein the third layer is comprised of a metal thread having a diameter D3 equal to the diameter D2.

4. The rolling assembly according to claim 1, wherein the angles A2 and A3 formed respectively by the metal threads that comprise the second and third layers of the bead wire are at least equal to 3° and at most equal to 8°.

5. The rolling assembly according to claim 1, with the second layer of the bead wire comprising, in any radial section, N2 sections of individual threads of diameter D2, wherein the number N2 of sections of individual threads of diameter D2 is at least equal to 5.

6. The rolling assembly according to claim 1, with the second layer of the bead wire comprising, in any radial section, N2 sections of individual threads of diameter D2, and with the third layer of the bead wire comprising, in any radial section, N3 sections of individual threads of diameter D3, wherein the number N3 of sections of individual threads of diameter D3 is at least equal to the number N2+6 of sections of individual threads of diameter D2.

7. The rolling assembly according to claim 1, wherein the diameter D1 of the metal thread that comprises the core of the bead wire is at least equal to 1.2 mm and at most equal to 4.5 mm.

8. The rolling assembly according to claim 1, with the metal threads of which the first, second and third layers of the bead wire are comprised of steel and having a breaking strength Rm, wherein the breaking strength Rm of a steel thread is at least equal to 1000 MPa and at most equal to 3000 MPa.

9. The rolling assembly according to claim 1, with the bead wire having a circular radial cross section of diameter $D_S$, wherein the diameter $D_S$ of the circular radial cross section of the bead wire is at least equal to 4 mm and at most equal to 25 mm.

10. The rolling assembly according to claim 1, wherein the body comprises an annular seat reinforcer radially on the inside of the adapter seat.

11. The rolling assembly according to claim 10, wherein the annular seat reinforcer comprises a reinforcing element coated in a polymer material.

12. The rolling assembly according to claim 11, wherein the reinforcing element of the annular seat reinforcer comprises a metallic material such as steel.

13. The rolling assembly according to claim 11, wherein the reinforcing element of the annular seat reinforcer comprises glass fibres coated in a polymer material.

14. The rolling assembly according to claim 1, wherein the reinforcers are mutually parallel within one and the same layer and crossed with one another from one layer to the next, and wherein each of the layers of the main reinforcement of the body comprises reinforcers which make, with a circumferential direction of the tire, an angle at least equal to 30°, and coated with a polymer material having an elastic modulus at 10% elongation at most equal to 70 MPa.

15. The rolling assembly according to claim 1, wherein an adapter is provided for each bead of the tire.

16. The rolling assembly according to claim 1, with the metal threads of which the first, second and third layers of the bead wire are comprised of steel and having a breaking strength Rm, wherein the breaking strength Rm of a steel thread is at least equal to 1400 MPa and at most equal to 2800 MPa.

17. The rolling assembly according to claim 1, with the bead wire having a circular radial cross section of diameter $D_S$, wherein the diameter $D_S$ of the circular radial cross section of the bead wire is at least equal to 6 mm and at most equal to 21 mm.

18. An adapter for a rolling assembly having an axis of rotation, the rolling assembly comprising a tire having two beads, a rim having two rim bead seats, for each bead, the adapter providing the connection between the bead and the rim, the adapter comprising:

an axially inner end comprising an inner reinforcing element and adapted to be mounted on a rim bead seat;

an axially outer end comprising an outer reinforcing element and adapted to come into contact, via a substantially radial axially inner face, or bearing face, with a bead;

a body connecting the axially outer end to the axially inner end so as to form a single piece, and comprising at least one main reinforcement providing the connection between the outer reinforcing element and the inner reinforcing element, and comprising a substantially axial adapter seat adapted to come into contact with a bead, wherein the outer reinforcing element is wholly axially on the outside of the bearing face, wherein the outer reinforcing element is an annular structure, referred to as a bead wire, having a mean line and comprised of a stack of at least three layers comprised of metal threads and concentric with respect to the mean line, wherein a first layer or core comprises at least one metal thread having a diameter D1 at least equal to 0.8 mm and at most equal to 5 mm, wherein a second layer is comprised of a metal thread having a diameter D2 at most equal to 1.4 times the diameter D1 and wound in a helix around the core, forming, with the mean line of the bead wire, an angle A2 at least equal to 2° and at most equal to 10°, and wherein a third layer is comprised of a metal thread having a diameter D3 wound in a helix around the second layer, forming, with the mean line of the bead wire, an angle A3 at least equal to 2° and at most equal to 10°, and of opposite sign to that of the angle A2, wherein the body comprises an annular seat reinforcer radially on the inside of the adapter seat, and wherein the annular seat reinforcer has a compression modulus greater than or equal to 1 GPa.

19. An adapter for a rolling assembly having an axis of rotation, the rolling assembly comprising a tire having two beads, a rim having two rim bead seats, for each bead, the adapter providing the connection between the bead and the rim, the adapter comprising:

an axially inner end comprising an inner reinforcing element and adapted to be mounted on a rim bead seat;

an axially outer end comprising an outer reinforcing element and adapted to come into contact, via a substantially radial axially inner face, or bearing face, with a bead;

a body connecting the axially outer end to the axially inner end so as to form a single piece, and comprising at least one main reinforcement providing the connection between the outer reinforcing element and the inner reinforcing element, and comprising a substantially axial adapter seat adapted to come into contact with a bead, wherein the outer reinforcing element is wholly axially on the outside of the bearing face, wherein the outer reinforcing element is an annular structure, referred to as a bead wire, having a mean line and comprised of a stack of at least three layers comprised of metal threads and concentric with respect to the mean line, wherein a first layer or core comprises at least one metal thread having a diameter D1 at least equal to 0.8 mm and at most equal to 5 mm, wherein a second layer is comprised of a metal thread having a diameter D2 at most equal to 1.4 times the diameter D1 and wound in a helix around the core, forming, with the mean line of the bead wire, an angle A2 at least equal to 2° and at most equal to 10°, and wherein a third layer is comprised of a metal thread having a diameter D3 wound in a helix around the second layer, forming, with the mean line of the bead wire, an angle A3 at least equal to 2° and at most equal to 10°, and of opposite sign to that of the angle A2, wherein the body comprises an annular seat reinforcer radially on the inside of the adapter seat, and wherein the annular seat reinforcer has a compression modulus greater than 10 GPa.

* * * * *